United States Patent [19]

Gerharz

[11] 4,280,055
[45] Jul. 21, 1981

[54] MICROWAVE IMAGE CONVERTER

[75] Inventor: Reinhold Gerharz, Bethesda, Md.

[73] Assignee: The United States of America as represented by the Secretary of the Army, Washington, D.C.

[21] Appl. No.: 120,011

[22] Filed: Feb. 8, 1980

[51] Int. Cl.³ .......................................... H05B 33/00
[52] U.S. Cl. ................... 250/484; 250/458; 250/459; 343/17
[58] Field of Search ............... 250/484, 458, 459; 343/17; 329/144

[56] References Cited

U.S. PATENT DOCUMENTS

| 2,546,160 | 3/1951 | Lengyel | 250/484 |
| 2,711,530 | 6/1955 | Rines | 250/484 |
| 2,928,937 | 3/1960 | Harman, Jr. | 250/484 |
| 3,585,394 | 6/1971 | Higby et al. | 250/484 |
| 3,610,932 | 10/1971 | Morse et al. | 250/484 |
| 3,959,658 | 5/1976 | Ziemer et al. | 250/484 |

*Primary Examiner*—Davis L. Willis
*Attorney, Agent, or Firm*—Nathan Edelberg; Milton W. Lee; John E. Holford

[57] ABSTRACT

A microwave detector and microwave image-to-visible image converter is provided for a microwave receiver which employs an array of electroluminescent devices. Circuit means is also provided to bias these devices close to or beyond the point where they become relaxation oscillators in order to further sensitize them to microwaves. Finally, active optical means is provided to increase the visible intensity and/or contrast of the visible image.

10 Claims, 10 Drawing Figures

MICROWAVE IMAGE CONVERTER

The invention described herein may be manufactured, used, and licensed by the U.S. Government for governmental purposes without the payment of any royalties thereon.

BACKGROUND OF THE INVENTION

1. Field of the Invention

The invention relates to a display device for a microwave surveillance system.

2. Description of the Prior Art

Due to the long wavelengths used in microwave surveillance systems, these systems were originally used only to detect the presence of large airborne targets. As the wavelengths become shorter the possibility of detecting ground targets was finally realized, although the scanning technique of using a scanned beam did not approach the maximum resolution of which these wavelengths are capable.

With the closing of the gap between radar frequencies and optical frequencies a considerable effort has been expended in extending the higher resolution optical target identification techniques to the microwave domain. One technique which is being used in the far infrared domain is the use of large arrays of detectors in the image plane of an optical lens system. Reflective type lenses or mirrors are used to avoid the frequency dispersion problems of refractive optics. Theoretically the ideal detector spacing is half a wavelength, easily achieved at microwave frequencies but difficult, if not impossible at optical frequencies. On the other hand the light quanta available at the optical detectors are more energetic and more numerous than at the microwave detector. This lower energy level makes it more difficult to convert the microwave image into a visible image.

SUMMARY OF THE INVENTION

The invention provides a novel microwave image converter for target identification purposes using a large array of microwave detectors which can be rendered extremely sensitive to changes in the level of incident microwave energy, and/or the converted visible or infrared image can be brightened enormously. It is further proposed that the detector element itself be used as a microwave to visible light converter.

BRIEF DESCRIPTION OF THE DRAWINGS

These and other objects of the invention will be best understood with reference to the attached drawings wherein.

DESCRIPTION OF THE PREFERRED EMBODIMENT

Figure 1:
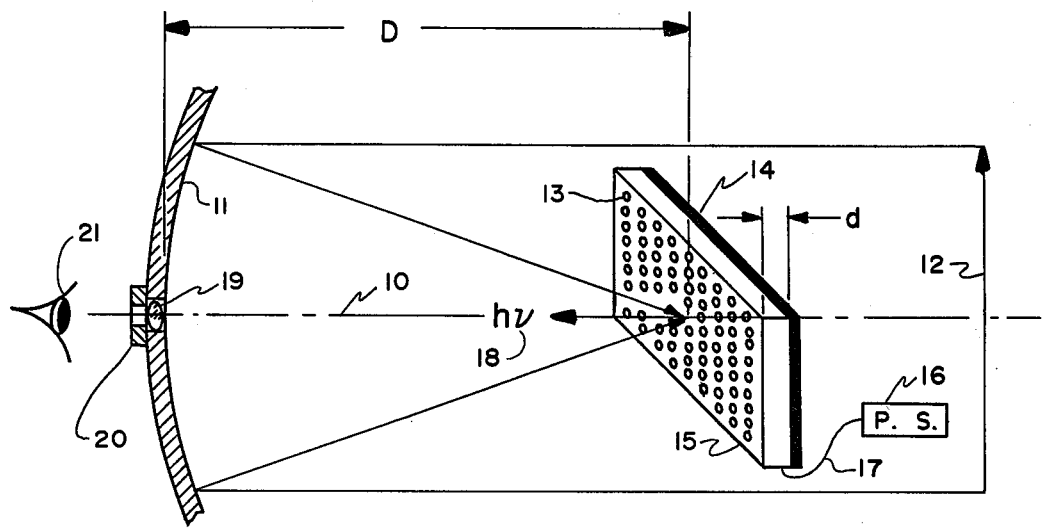
FIG. 1 shows the general structure of the microwave to visible image conversion system according to the invention.

Referring specifically to FIG. 1 a simplified version of the image converter is shown. The converter uses a lens 11, preferably reflector or dish of symmetric design. The concave side of the reflector gathers the microwaves emitted or reflected by a distant target 12 and focuses them on an image plane centered on and perpendicular to its optical axis 10 (axis of revolution or symmetry), which plane is spaced a distance D from the center of the dish. An array of microwave detectors 13 is substantially centered on the optical axis and the image plane. At a minimum the detectors may be placed a half-wavelength apart at the microwave frequency. A metal back reflector 14 is preferably mounted an odd number of quarter wavelengths further than D behind the detectors to produce a standing wave pattern with maximum intensity at the image plane. The detectors may be directly coupled to the back reflector as a ground plane and/or supported by a potting layer 15 of foamed plastic or other low loss microwave material. The spacing of the backing plate from the detectors may also be made adjustable. Depending on the type of detector there will usually be a requirement for a power supply 16. In order to achieve a real-time high resolution readout the present invention employs detectors with materials which emit visible light quanta 18 when they absorb microwaves, i.e. electroluminescent materials. Light so emitted is gathered by an eyepiece 19 mounted in a close fitting aperture at the center of the dish and focussed on a second image plane, e.g. the retina of an observer's eye 21 on the convex side of the dish. As used herein, light includes the far infrared and higher frequencies. A metal iris 20 attached to the convex side of the dish may be used to limit the angle of view to the solid angle subtended by the array. The detector may be gaseous liquid, solid or combinations thereof. One well known detector consists of mercury vapor in a glass envelope, the latter being coated with a phosphor as used for example in fluorescent light fixtures. Gases such as neon and xenon emit visible photons directly when ionized. Solid electroluminescent materials including compounds of Zn, S, Se, Cu, and Mn, also exhibit such effects. The term electroluminescent as used herein is not restricted to materials or devices which emit visible photons in response to an alternating electric field. It also applies to photons above or below the visible, particularly in the near and far infrared portion of the light spectrum.

Figure 2:
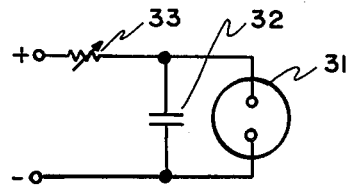
FIG. 2 shows a photon emitting medium type detector.
Figure 3:
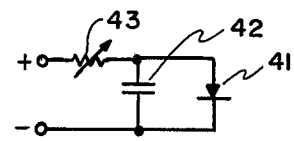
FIG. 3 shows a normally biased diode type of detector.
Figure 4:
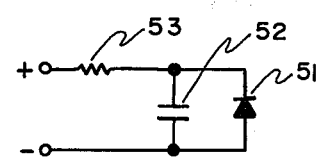
FIG. 4 shows a reversed biased or avalanche type diode detector.

FIG. 2 shows an arrangement for increasing the sensitivity of a detector element. The light emitting media or electroluminescent device is subject to an electric field bias just below a break down threshold for the media. Numerous examples of such thresholds are listed in electronic literature. The microwave fields provide the additional stress which produces breakdown and emission of light quanta. The energy of the microwaves may thus be a number of orders of magnitude smaller than that required to cause breakdown of the unbiased media. This device thus requires the power supply 16. The light produced is a function of the electrical capacity of media and its electrode configurations and is preferably increased by the addition of a separate parallel capacitor 32. The current drain on the power supply can be eased by limiting with a series resistor 33, which may also be adjustable. The series combination of the capacitor 32 and resistor 33 are characterized by a well known time constant which can be used to advantage with a pulsed microwave illuminator. The maximum stress on the media can be timed to coincide with such microwave pulses. FIG. 3 shows a similar arrangement using two or more layers of media which form a forward biased diode structure 41, e.g. a light emitting diode, with series timing element 42 and 43. Gallium arsenide or gallium phosphide are common diode materials for the purpose. FIG. 4 similarly shows a back biased diode which operates in an avalanche mode, with its timing elements 52 and 53. This is less common than the forward biased type.

Figure 5:
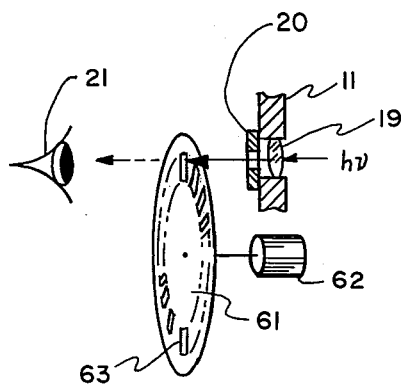
FIG. 5 shows a mechanical shutter to chop light from the detector.
Figure 6:
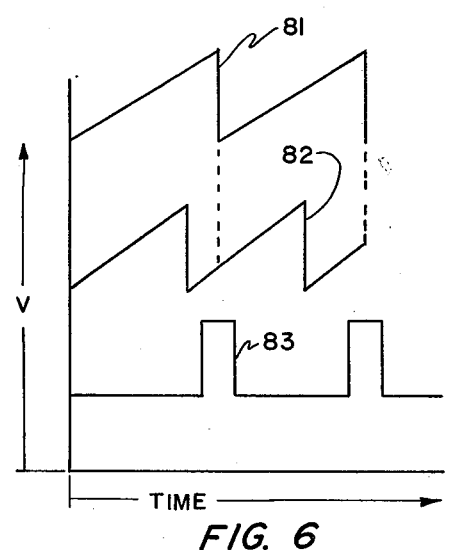
FIG. 6 is a graph of the voltages applied to the detector of FIGS. 2-4 for two levels of incident microwave radiation compared with the light transmission function of the shutter of FIG. 5.

FIG. 5 shows a shutter mechanism which can be used to advantage with the timing elements described above to form a second embodiment of the invention. The shutter consists of a rotating disc 61, or the like, driven by a motor 62. The disc contains slots 63 which pass between the iris member 20 and the observers eye 21 at about the same frequency determined by the timing elements. In this embodiment the electroluminescent device is preferably stressed to breakdown even in the absence of microwave energy. As shown in FIG. 6 the voltage across the detector media oscillates as a sawtooth wave with a breakdown portion 81 in the absence of microwave energy. This detector element when subjected to microwave energy breaks down sooner than one that is not, thereby producing a higher frequency sawtooth with a time advanced breakdown portion 82. The angular velocity of the shutter in FIG. 5 and the size and number of slots (the slot size being a function of the metal iris size and eyepiece power) are adjusted to provide a period about as short as the breakdown period of the detector media, or as close thereto as practical. When viewed through the revolving shutter the breakdown period of the detectors subjected to microwave energy will be less intense and coincide less often with the shutter opening. Those detectors will thus appear dimmer than the remaining detectors. If the microwave image remains substantially constant in intensity the shutter can be synchronized with the waveform 82 so that a reversed effect can be obtained. Thus by providing the observer with a variable speed control for the shutter, which might for example be a breaking mechanism on the edge thereof or a speed control for motor 62; that person can provide whichever synchronization provides the best view of the target. Pulse gated light shutters using liquid crystals and electrically controlled polarization can also be used. To restore synchronism of the detectors the power supply may be temporarily removed until all capacitors have been discharged manually (shored by a wire not shown) or through their leakage resistance (which can be decreased by adding a parallel resistor, not shown, many times the value of the charging resistor) or preferably means can be provided to short all of the capacitor terminals simultaneously as will be discussed at FIG. 8, without removing the power supply.

Figure 7:
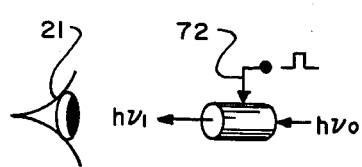
FIG. 7 shows an electronic shutter which can be used to replace the shutter of FIG. 5.

FIG. 7 shows an image converting device 71 which can be used to greatly intensify and clarify the image seen by the observer. This device replaces the eyepiece and iris in FIG. 1 as well as the shutter and motor in FIG. 5. One form of these devices, known as an image intensifier, amplifies light by the use of photo-electric emission of electrons, electron multiplication and photo luminescence of phosphors. The most recent of these devices employs a microchannel plate which is self limiting in brightest and which may employ sophisticated contrast control systems. The shutter effect can be easily produced by electrically switching the low voltage power supply lead 72, which normally is connected to a battery, in a manner well known in the electronic art. An added advantage of the image intensifier tube is that it can convert photons $h\nu_0$ beyond the visible spectrum to visible photons $h\nu_1$. Another form of converting device, which is currently much more complicated and expensive, is the infrared viewer. This device operates at wavelengths much longer than those to which the image intensifier is sensitive, for example, 2–14 microns. These devices also contain voltage controlled detectors which can be switched on and off.

Figure 8:
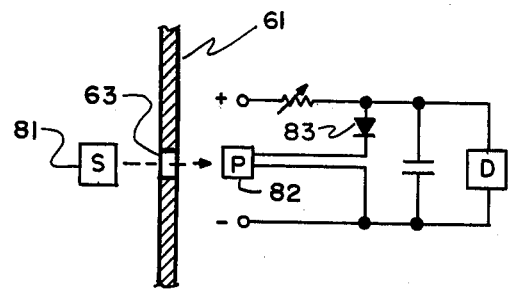
FIG. 8 shows a synchronizing circuit for use with the detectors of FIGS. 2-4.

FIG. 8 shows a means for synchronizing the detectors with the shutter. A switching device 82 shorts the capacitor during viewing period 83 of FIG. 6. If the converter of FIG. 7 is used, this can be any electromechanical or solid state relay such as a transistor operated by the same pulse that is applied to lead 72, but with the shutter it is preferred to use a photoconductor with a light source 81 which directs a beam through the slot 63. The beam enables the photoconductor immediately after the viewing period reducing the capacitor voltage to zero. To adjust this, timing elements 81 and 82 are best mounted in fixed relation to one another and moveable in the direction of motion of the shutter. The diode 83 isolates the positive capacitor terminal from similar terminals of other capacitors similarly coupled to the positive photodiode terminal so that all capacitors can use the same photodiode, if desired.

Figure 9:
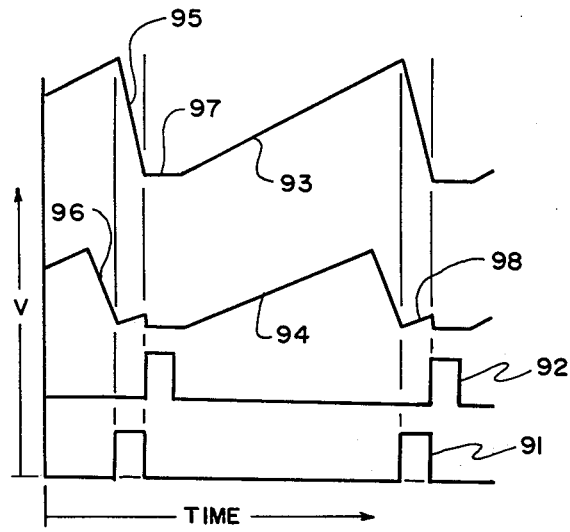
FIG. 9 shows a graph similar to that of FIG. 6 with the synchronizing pulses produced by the FIG. 8 arrangement and their affects added.

FIG. 9 shows the waveforms that result when the circuit of FIG. 8 is used. Wave form 91 represents the viewing period determined by the shutter or image converting device of FIG. 7. Waveform 92 represents the synchronizing pulse of the FIG. 8 or FIG. 7 devices. Waveform 93 is the detector voltage with no microwave energy present. The breakdown is exaggerated in time to match the exaggerated viewing period used in FIGS. 6 and 9. Note the slight delay 97 at the beginning of the waveform which is duplicated for the waveform 94 when microwave energy is present. The breakdown of the latter is still delayed so that some or all of the light emitting period falls outside the viewing period. The overall period of both waveforms is now the same, however, the difference being provided by a negligible small sawtooth in waveform 94 during the viewing period. Reverse contrast in this arrangement is obtained by advancing the synchronizing pulses 92, i.e. physically moving the elements 81 and 82 in FIG. 8 or delaying the pulse applied to lead 72 in FIG. 7 relative to the pulse applied to element 82 in FIG. 8. Synchronization need not occur on every cycle, but can be omitted for several cycles by pulsing light source 81, for example, if desired.

Figure 10:
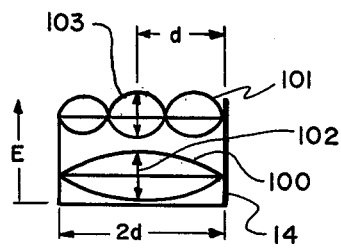
FIG. 10 shows a graph of standing waves from two related microwave frequencies impinging the backing plate in FIG. 1.

A desirable region in the microwave band to operate is where there is a natural low attenuation window in the earths atmosphere. Such windows occur near the frequencies of 30 and 95 Ghz. FIG. 10 shows the approximate absolute values of standing wave E—field patterns that occur when waves of these frequencies are reflected from a backing plate 14 as shown in FIG. 1. The distance to the first minimum of the 30 Ghz pattern is arbitrarily set as $2d$ so that the quarter wavelength criteria cited at FIG. 1 satisfied. The 95 Ghz pattern has its third minimum at nearby $2d$ making d nearly equal to $\frac{3}{4}$ wavelength which also meets the same criteria. When the desired wavelengths are not exact odd multiples a compromise must be reached. For example, suppose frequencies corresponding to quarter wavelengths of 2.7 mm and 0.8 mm are desired. A compromise d of 2.5 mm results in an error of about 6% in meeting both the quarter and three quarter wavelength criterion.

I claim:

1. A method for converting an image transmitted by microwaves of a given wavelength and pulsed at a given pulse frequency into a visible image comprising the steps of:
    focussing the microwaves at a first image plane;
    placing an array of electroluminescent detectors spaced apart at least a half of said given wavelength in said first image plane to cause emission of photons therefrom;
    focussing said photons into a photon image much smaller than said microwave image at a second image plane that does not lie in the path of said microwaves; and
    generating a final image containing a much larger number of visible photons in direct proportion to the photons at each point in said photon image.

2. The method according to claim 1 wherein most of said photons in said photon image have wavelengths less than two microns and said generating step includes the step of:
    forming a visible image of said photon image with an image intensifier.

3. The method according to claim 1 wherein most of said photons in said photon image have wavelengths greater than two microns and said generating step includes the step of:
    forming a visible image of said photon image with a far infrared viewer.

4. The method according to claim 1 wherein said detectors only emit photons during short peak periods which recur at said given pulse frequency of said microwaves incident thereon and said step of focussing said photon image further includes:
    focussing said photon image only for a short viewing period closely approximating said peak periods in duration and timing.

5. A microwave to visible image converter comprising:
    a lens means to focus a microwave image on a first image plane;
    a plurality of spaced electroluminescent detectors in said image plane;
    a light processing means optically coupled to said detectors to activate a separate source of high intensity visible light substantially in direct proportion to the total light emitted by each of said detectors; and
    an eyepiece means optically coupled to said processing means to focus said visible light into a visible image directly corresponding to said microwave image.

6. A microwave to visible image converter according to claim 5, wherein:
    said detectors include means emitting light in pulses at said given pulse frequency; and
    said processing means includes a shutter means between said detectors and said eyepiece to chop said visible light at a chopping rate close to said given pulse frequency.

7. A microwave to visible image converter according to claim 6, wherein:
    said processing means, said shutter means and said eyepieces means constitute an image intensifier, the enabling power supply for said image intensifier comprising a source of pulses supplied at said chopping rate.

8. A microwave to visible image converter according to claim 6 wherein:
    said processing means, said shutter means and said eyepiece means constitute a far infrared viewer, the enabling power supply for said viewer comprising a source of pulses supplied at said chopping rate.

9. A microwave to visible image converter according to claim 5, wherein:
    said processing means and eyepiece means consist of an image intensifier.

10. A microwave to visible image converter according to claim 5, wherein:
    said processing means and said eyepiece means consist of a far infrared viewer.

* * * * *